UNITED STATES PATENT OFFICE.

EDWARD D. KENDALL, OF ELIZABETH, NEW JERSEY, ASSIGNOR OF ONE-THIRD TO E. N. DICKERSON, OF STOVALL, NORTH CAROLINA.

PROCESS OF PRODUCING ALUMINA.

1,013,022.     Specification of Letters Patent.     Patented Dec. 26, 1911.

No Drawing.     Application filed January 11, 1908. Serial No. 410,450.

*To all whom it may concern:*

Be it known that I, EDWARD D. KENDALL, a citizen of the United States, residing at Elizabeth, in the county of Union, State of New Jersey, have invented a new and useful Improvement in Processes of Producing Alumina, (Aluminium Oxid, $Al_2O_3$,) of which the following is a specification.

My invention relates to methods of separating alumina from associated bodies in argillaceous earths, clays and shales and the objects of the same are to utilize cheap and abundant sources of alumina, particularly kaolinites or clays, and to provide a cheap and economical process of obtaining alumina therefrom.

In carrying out my invention, I first select such natural argillaceous earth, clay or shale as preliminary examination shall show to be the best adapted for my purpose. (I will hereinafter refer to such bodies by the word "clay.") In some instances, a moderate degree of heat may be applied to the selected clay in order to drive off combined water and render the clay more permeable by liquid. The clays that are available for this process may be residual or sedimentary clays and may have different physical and mineralogical features, but the essential chemical character must be that they consist chiefly of silicate of alumina; the shales suitable for this process are not the exceedingly indurated clays (shales) but such as being ground with water become soft and more or less plastic and like the natural hydrated aluminium silicate. The clay is to be finely pulverized and then transferred to one of the known forms of digesters made of iron or steel and preferably of cylindrical form and capable of bearing considerable pressure from within, which digester is to be fitted with any of the suitable and known appliances for stirring the contents thereof; into this digester is also put aqueous solution of caustic alkali. I prefer to use caustic soda (sodium hydroxid, NaOH), because it is efficient and cheap; the required quantity of caustic soda solution may be supplied to the interior of the digester at the same time and proportionately with the powdered clay, or the entire required volume of that solution may be led into the digester before the introduction of the clay. A quantity of caustic soda solution should be used sufficient to form with the clay, after agitation, a thin mud. The agitation or stirring should be continued unremittingly while regulated heat is applied to the digester, the degree of which heat is limited only by the strength of the material of the digester and its power to safely withstand the vapor pressure from within; temperatures from 135° C. to 150° C. will suffice and the same temperatures will answer in the succeeding step of the process, viz: the treatment with cream of lime next to be described. The time during which the clay shall be so digested with the caustic soda solution varies with the different kinds of clay and with the degree of heat maintained and is to be determined by experimental tests; it may be three hours or more. At the expiration of the suitable period the source of heat is to be removed and when the digester shall have cooled so far as that it may be safely opened a sufficient quantity of cream of lime is to be added to the mass within the digester, the said cream of lime having been recently made from freshly burned lime by slaking the same with excess of hot water. After the addition of the lime, the digester is to be closed as before, agitation recommenced and heat again applied and continued for one or two hours or more, after which the digester is to be allowed to cool sufficiently to permit of the contained semi-fluid mass being transferred therefrom to a filter-bed of any suitable porous material; when most of the liquid part of the mass shall have drained off and passed through the filtering medium, the solids on the filter are to be washed with a limited quantity of hot water, these wash waters passing through the filter bed and increasing the volume of the filtrate which now contains much sodium aluminate ($Na_2Al_2O_4$). From the solution of sodium aluminate, alumina is to be precipitated by passing through the said solution gaseous carbon dioxid after which the liquid which is to be separated from the precipitated alumina by filtration, to which is to be added the first portions of water which is to be used freely for washing the precipitated alumina, becomes a solution of sodium carbonate ($Na_2CO_3$) which may be converted into caustic soda solution for use in the next operation by boiling it with lime; the alumina so produced having been thoroughly washed is to be dried by any suitable means and is then ready for the market.

The quantities of caustic soda and of lime, proportionate to the clay, to be used in my above described process vary with the character and constituents of the clay and are to be determined—the quantity of the caustic soda by the contained amount of alumina and the quantity of lime by the contained amount of silica; for example, each one hundred pounds of a pure kaolinite containing thirty-nine per cent. of alumina, forty-five and a half per cent. of silica and fifteen and a half per cent. of water would require nineteen pounds of caustic soda (actual NaOH) and forty-two and a half pounds of lime (actual CaO); a larger quantity of caustic soda may be used and a less amount of lime and the volumes of water are not to be determined by the quantities of soda and lime alone, but also by the physical characters of the different clays, some of which require more water than others in order to form a body sufficiently fluid to be agitated throughout when a portion thereof is forcibly stirred; for the quantities of soda and lime above specified the caustic soda may be dissolved in 27 gallons of water and, allowing three gallons of water for the hydration of the lime, an additional 12 to 15 gallons will suffice to form the cream of lime.

The solution of caustic soda may contain ten per cent. of sodium hydroxid, but preferably it should, usually, be a more concentrated solution in which instance aqueous solution of the produced sodium aluminate is facilitated by the water of the cream of lime which amount of water may and in practice will vary within wide limits, these determined by the characters of the clays.

What I claim as my invention and desire to secure by Letters Patent is:

The herein described process of producing alumina from clays, which process consists in subjecting the natural clay to the chemical action of a solution of caustic alkali under heat and pressure, afterward adding to the mass cream of lime, with renewed application of heat and pressure, then separating by filtration the solution of alkali-metal aluminate so formed, then precipitating alumina from the filtrate by treatment with carbon dioxid at the ordinary temperature, then washing and drying this precipitate, substantially as described.

In testimony whereof I have signed this specification in the presence of two subscribing witnesses.

EDWARD D. KENDALL.

Witnesses:
   Frank E. Raffman,
   Paul H. Frank.